Nov. 7, 1961     A. W. LIDERT     3,007,276

FISHING LURE

Filed May 20, 1960

INVENTOR.
Albert W. Lidert
BY
Angus & Mon
ATTORNEYS.

United States Patent Office 3,007,276
Patented Nov. 7, 1961

3,007,276
FISHING LURE
Albert W. Lidert, 433 S. Meadow Road,
West Covina, Calif.
Filed May 20, 1960, Ser. No. 30,661
6 Claims. (Cl. 43—26.2)

This invention relates to fishing lures and has for its principal object to provide a lure capable of unusually attractive movement to fish.

Many varieties of fishing lures have been made available to fishermen. Such lures have been provided with a great variety of shapes, configurations or appendages adapted to make them move in a peculiar or distinctive manner when pulled through the water by a fisherman, for the purpose of attracting fish.

In accordance with the present invention there is provided a lure which is made capable of going through its characteristic and peculiar motions in the water by reason of a motor and clutch arrangement carried in the lure itself and operated by the fisherman. This arrangement produces unusual movements of the lure not obtainable by previously known lures.

A feature of the mechanism of the lure resides in the provision of a power or motor spring which is caused to be wound up and released by action of the fishing line manipulated by the fisherman. A clutch arrangement inoperative during the winding of the power spring and automatically operative during unwinding, serves to rotate a shaft by the unwinding of the power spring; and suitable paddles on the shaft serve to give the lure its peculiar motions.

The foregoing and other features of the invention will be better understood from the following detailed description and the accompanying drawing of which:

Figure 1:
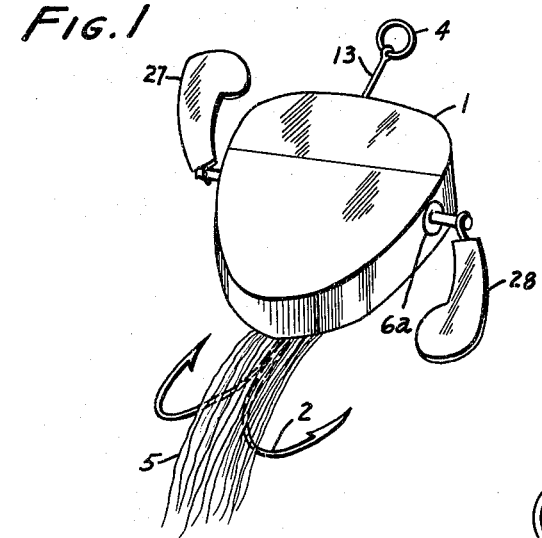
FIG. 1 is an isometric view showing a lure in accordance with this invention.
Figure 2:
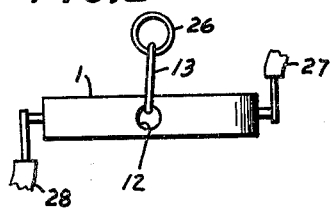
FIG. 2 shows a front view of the lure of FIG. 1.

Referring to the drawing, there is shown a fishing lure having a body portion in a form having a flat or flattened top and bottom and rounded or streamlined forward and rear portions, with a fish hook 2 attached underneath the rear portion and a line 13 extending from the forward portion and attached to a connecting ring 4. If desired, a suitable feather or tail portion 5 may be attached in the region of the hook in a conventional manner. The interior of the lure 1 is arranged to accommodate a cylindrical barrel 6 having circular end pieces 7 and 8 press-fitted into the opposite ends of the barrel. The end pieces are provided with respective holes 9 and 10 which act as bearings for a shaft or spindle 11 which is located along the longitudinal axis of the barrel and protrudes at both ends through to the exterior of the end pieces.

The lure may be of solid material such as wood or plastic or it may have a hollow interior. Assuming the use of a solid lure, it will be provided with a transverse cylindrical bore 6a large enough to receive the barrel 6 and its end pieces 7 and 8; and the length of the barrel will be such that the end pieces 7 and 8 will be approximately flush with the respective sides of the lure as shown in FIG. 1, so that these end pieces are, in effect, part of the body portion. The barrel will then be cemented in position within the lure. In the even the lure is hollow in the region of the barrel, or entirely hollow, then the side walls will have openings at 6a where the end pieces are fitted, and the cementing will be done only at the positions of the end pieces 7 and 8. Regardless of whether the lure is hollow or solid, there will be provided a hole 12 through its front end which communicates with the barrel and allows a line 13 to extend through to the barrel and through a hole 25 in the wall of the barrel and aligned with hole 12.

Within the barrel 6 the spindle 11 has freely mounted on it a spool 14 to which the line 13 has its end attached and is wound in a number of turns around to the core of the spool. The spool is provided with its two flanges 15 and 16 at the ends of its core. One of the flanges 15 has attached to it at 17 a power or motor spring 18 the other end of which is attached at 19 to the end piece 8. The other spool flange 16 is provided with a collar portion 20 exterior of the spool over which there is placed a portion 21 of a clutch spring 22. Another portion 23 of the clutch spring fits over the spindle 11. Since the outside diameter of the collar 20 is greater than the diameter of spindle 11, the diameter of the spring portion 21 will be greater than the diameter of clutch spring portion 23, although the clutch spring is made of one piece with a number of helical convolutions forming each of its portions 21 and 23. The inside diameter of the convolutions of portion 21 is made to fit nicely over the collar 20 without binding under the normal condition of the spring; and similarly, the inside diameter of the convolutions of portion 23 are made to fit nicely over spindle 11 without binding under the normal spring condition.

Line 13 is wound around the spool many times to provide a winding 24. After assembling the mechanism within the barrel as just described, the barrel is inserted into its position within the lure and attached as by cementing as described above. Then the free end of line 13 may be gripped by a narrow-nosed pincher or the like passed through the hole 12 in the front of the lure and also through the hole 25 in the front side of the barrel so that the line is then pulled out the front of the lure where a suitable ring 26 is attached to it. The ring 26 is large enough so that it will not pass through the hole 12.

Paddles 27 and 28 are then fastened over the opposite ends of shaft 11 outside the lure. The paddles 27 and 28 are held by respective stems 29 and 30 fitted into the ends of the paddles, the opposite ends of the stems being attached to respective collars 31 and 32 mounted over the opposite ends of the shaft 11 outside the end pieces 7 and 8. The collars can be force-fitted onto the shaft 11 or secured to the shaft by set screws or the like so that they will turn with the shaft. If desired, the stems 29 and 30 can be snugly fitted by a frictional fitting into the ends of their respective paddles so that the paddles can be turned on the stem to produce different angles with the water.

To use the lure, the fisherman will tie the end of his line from the fishing rod onto the ring 26 and lower his lure into the water. Since the lure should preferably be of the floating type it will remain on top of the water. When the fishing line is slack, the helical power spring 18 is in an unwound condition with the line 13 substantially all wound on the spool 14. To produce motion of the lure, the fisherman will pull on the tip of his rod to pull line 13 out from the lure and off the reel 14. This will wind up the reel and turn it counterclockwise as viewed from the end of shaft 11 which carries paddle 28; and this rotation will serve to wind up spring 18.

The direction of the helical winding of clutch spring 22 is such that the turning of the spool in this direction does not cause the portion 21 of the clutch spring to grip the collar 20 of the spool. This will be true when the counterclockwise direction of rotation of the spool is opposite to the direction of winding of the helical spring 22; and this condition will occur, for example, if the part of the clutch spring numbered 32a represents the end of the clutch spring. The frictional effect of this turning direction of the collar 20 acting on the clutch spring will thus tend to open up or expand the diameter of the clutch spring instead of to contract it down against the collar 20. Under this condition, the spool will turn freely relative to shaft 11 and there will be no substantial clutching action between the spool and the shaft.

Figure 3:
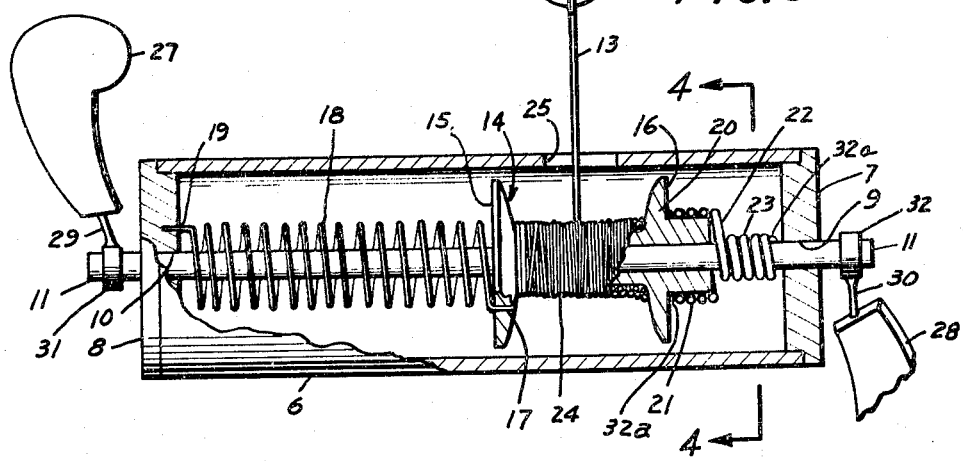
FIG. 3 is a view partially in cross-section and partially broken away of a barrel containing the power and clutch mechanism of the lure of FIGS. 1 and 2.
Figure 4:
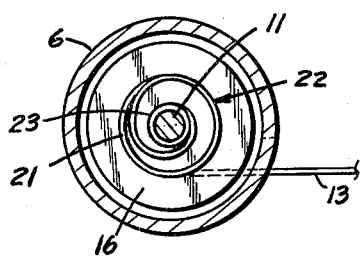
FIG. 4 is a cross-section view taken at line 4—4 of FIG. 3.

But when the fisherman eases up on the tension of his line, after having wound up the power spring, as by dipping the tip of his rod, the force which was put into power spring 18 will reverse the direction of rotation of the spool so that it will now rotate clockwise relative to the end of shaft 11 to which paddle 28 is attached, and thereby take back the length of line 13 which it lost during the winding-up operation. This direction of rotation will cause the portion 21 of the clutch spring to tighten down and grip the collar 20, for the friction between clutch spring portion 21 and the collar will now tend to cause the portion 21 to wind in the direction which will tighten it down against the collar. This tightening down action will be transmitted through the clutch spring even down to its portion of smaller diameter 23 at the region of shaft 11 so that in addition to clamping down against the collar 20, the clutch spring will also clamp down on shaft 11 and thereby turn the shaft 11 in the same direction that the spool is now turning. This will cause the paddles 28 to rotate; and since the lure is a top lure, when a paddle is at a top position in its rotation as shown by the position of paddle 27 in FIGS. 1 and 3, it will be substantially out of the water, but when it is in a lowermost position it will be in the water and act as a paddle. This alternate action of the two paddles in the water produces the peculiar movement of the lure and will cause the lure to progress through the water. By producing various movements of the tip of his rod and the corresponding action of his line, the fisherman may produce various kinds of movement of the lure.

It will be recognized that modifications may be made within the scope of the invention and that the lure may be made in various sizes and shapes. In general it has been found that for the power spring and the clutch spring, spring wire of .009 inch diameter is satisfactory, although this particular dimension may be departed from.

The invention is not limited to the particular embodiment illustrated and described, which is given by way of illustration rather than of modification and the invention is not limited except in accordance with the scope of the appended claims.

What is claimed is:

1. A fishing lure adapted for animated action in water comprising a body portion, a shaft journaled in the body portion, a spool freely mounted on the shaft, a line wound on the spool and having a free end extending from the spool, a power spring attached to the spool, a clutch spring having a first portion mounted over a part of the spool and having a second portion mounted over the shaft, and paddle means mounted on the shaft and adapted to engage the water outside the body, whereby pulling said line away from said spool winds up the power spring, and subsequent release of said line causes said wound up power spring to rewind the line on the spool, and also to cause the clutch spring to engage the spool and the shaft, whereby the shaft is rotated to operate the paddle means.

2. A fishing lure adapted for animated action in water comprising a body portion, a shaft journaled in the body portion, a spool freely rotatable on the shaft, a line wound on the spool and having a free end extending from the spool, a power spring attached to the spool, said spool having a collar, a clutch spring in the form of a helical spring winding having a first portion of greater diameter than a second portion, the first portion being freely mounted over the collar and the second portion being freely mounted over the shaft and paddle means mounted on the shaft and adapted to engage the water outside the body, whereby pulling said line away from said spool rotates the spool freely on the shaft under the condition of clutch disengagement and winds up the power spring, and subsequent release of said line causes said wound-up power spring to unwind and to rotate the spool in the opposite direction to rewind the line on the spool, said opposite direction of rotation serving to produce engagement of said clutch spring to provide driving between the spool and the shaft, whereby the shaft is rotated with the spool to operate the paddle means.

3. A fishing lure according to claim 2 in which the shaft extends transversely and horizontally across the body portion and the line extends forwardly through the forward end of the lure.

4. A lure according to claim 3 in which bearing means is fastened to the body portion and the shaft is journaled in the bearing means.

5. A lure according to claim 4 in which a barrel means is mounted over the bearing means, said barrel means having an opening through it at a forward portion thereof through which said line extends.

6. A lure according to claim 2 in which the power spring has a portion attached to the spool and another portion attached to the body portion.

References Cited in the file of this patent

UNITED STATES PATENTS

| | | |
|---|---|---|
| 2,704,416 | Laird | Mar. 22, 1955 |
| 2,813,365 | Cross | Nov. 19, 1957 |